United States Patent [19]

Seimiya et al.

[11] 4,435,723

[45] Mar. 6, 1984

[54] RECORDING APPARATUS WITH EDITING CAPABILITY

[75] Inventors: Ryubun Seimiya; Shigeru Inowa, both of Hino; Noriyoshi Tarumi, Hachioji; Masahiko Matsunawa, Hachioji; Hiroshi Tokunaga, Hachioji, all of Japan

[73] Assignee: Konishiroku Photo Industry Co., Ltd., Tokyo, Japan

[21] Appl. No.: 293,865

[22] Filed: Aug. 18, 1981

[30] Foreign Application Priority Data

Aug. 8, 1980 [JP] Japan .................................. 55-123525
Sep. 8, 1980 [JP] Japan .................................. 55-123523

[51] Int. Cl.³ .............................................. G01D 15/06
[52] U.S. Cl. ..................................... 346/154; 346/159; 358/300
[58] Field of Search ..................... 346/153.1, 154, 159; 358/300

[56] References Cited

U.S. PATENT DOCUMENTS 3,465,359  9/1969  Hackley et al. ................ 346/154 X
4,026,642  5/1977  Tanaka et al. .................. 358/300 X
4,160,257  7/1979  Carrish ............................... 346/159
4,316,199  2/1982  Greenig et al. .

Primary Examiner—Thomas H. Tarcza
Attorney, Agent, or Firm—Jordan B. Bierman; Linda Bierman; C. Cornell Remsen, Jr.

[57] ABSTRACT

A recording apparatus in which the coordinates of a portion of an image to be extracted or erased are determined, a scanning position is detected, and an image signal is switched for blocking or allowing the passage of image signals when said predetermined coordinates coincide with said detected position. An extrction means for extracting a portion of a document image or, an erasure device for erasing a portion of a document image, a designating device for designating a portion to be extracted or erased, and a numerical device for introducing the coordinates of the portion to be extracted or erased are provided.

6 Claims, 11 Drawing Figures

RECORDING APPARATUS WITH EDITING CAPABILITY

BACKGROUND OF THE INVENTION

1. Field of the Invention

The present invention relates to a recording apparatus having a so-called "editing function" to extract or erase a specified portion of either a document image or an image which is displayed in a display device, thereby to form an image.

2. Description of the Prior Art

In a copying machine or the like according to the prior art, there has been known a method of extracting or erasing a portion of a document image thereby to record an image. As one method of performing such editing operation, there is a method in which a document is irradiated with a light source and in which a liquid crystal or a shutter is arranged in the optical path of the reflected beam so that the pattern of an electrostatic latent image formed on a photosensitive member may be changed by either varying the optical transmission of the liquid crystal or controlling the aperture of the shutter. As another method, there is also known an overlay method in which a transparent plastic film bearing information to be recorded is overlaid upon a document image so that both may be recorded in a superposed manner. Of the former methods, the one using the liquid crystal is complicated in its wiring or its drive of control electrodes, whereas the other using the mechanical shutter is complicated in its mechanism. On the other hand, the overlay method has to resort to the provision of the transparent plastics and to be taken care in storage against blotting or damage.

SUMMARY OF THE INVENTION

In view of the background thus far described, therefore, the present invention contemplates performing an editing operation by electrically controlling the passage of image signals, which have been converted into electric signals, to image forming means. In the apparatus according to the present invention, in case a document image is to be edited, after the position of a portion of the document image to be extracted or erased has been determined, the reflected light of the image from the document is converted into electric image signals by the use of a solid state image sensor such as a charge coupled device (which will be shortly referred to as "CCD"), and the first and second scanning line numbers and picture element numbers corresponding to that position are compared with the numbers of the scanning lines and picture elements of the image signals so that the passage of the image signals is blocked or allowed during the time period from the instant when the number of the picture elements of the image signals coincides with the first picture element number to the instant when the same number coincides with the second picture element number after the number of the scanning lines of the image signals has coincided with the first scanning line number, whereby the image is formed by those image signals.

Another object of the present invention is to provide an electrostatic recording apparatus of the type, in which the group control is performed by use of electrostatic latent image forming means such as ion modulating electrodes or multi-stylus electrodes, thereby to perform the recording operation, the electrostatic recording apparatus being characterized in that the editing operation for extraction or erasure is to be performed by controlling the voltage to be applied to the continuous layer of a conductive material as a common electrode of the electrostatic latent image forming means. In the apparatus according to the present invention, more specifically, in case the document image is to be edited, after the position of the document image to be extracted or erased has been introduced, the reflected light of the image from the document is converted into electric image signals by the use of a solid state image sensor such as the CCD, and the first and second scanning line numbers corresponding to that position are compared with the number of the scanning lines of the image signals so that a predetermined potential is applied to that of the common electrodes of the electrostatic latent image forming means, which corresponds to the aforementioned position, when the number of the scanning lines of the image signals coincides with the first scanning line number, and so that the potential applied to those common electrodes is discharged when the number of the scanning lines of the image signals coincides with the second scanning line number.

The other objects and features of the present invention will be made apparent from the following description made with reference to the accompanying drawings.

DESCRIPTION OF THE PREFERRED EMBODIMENTS

Figure 1:
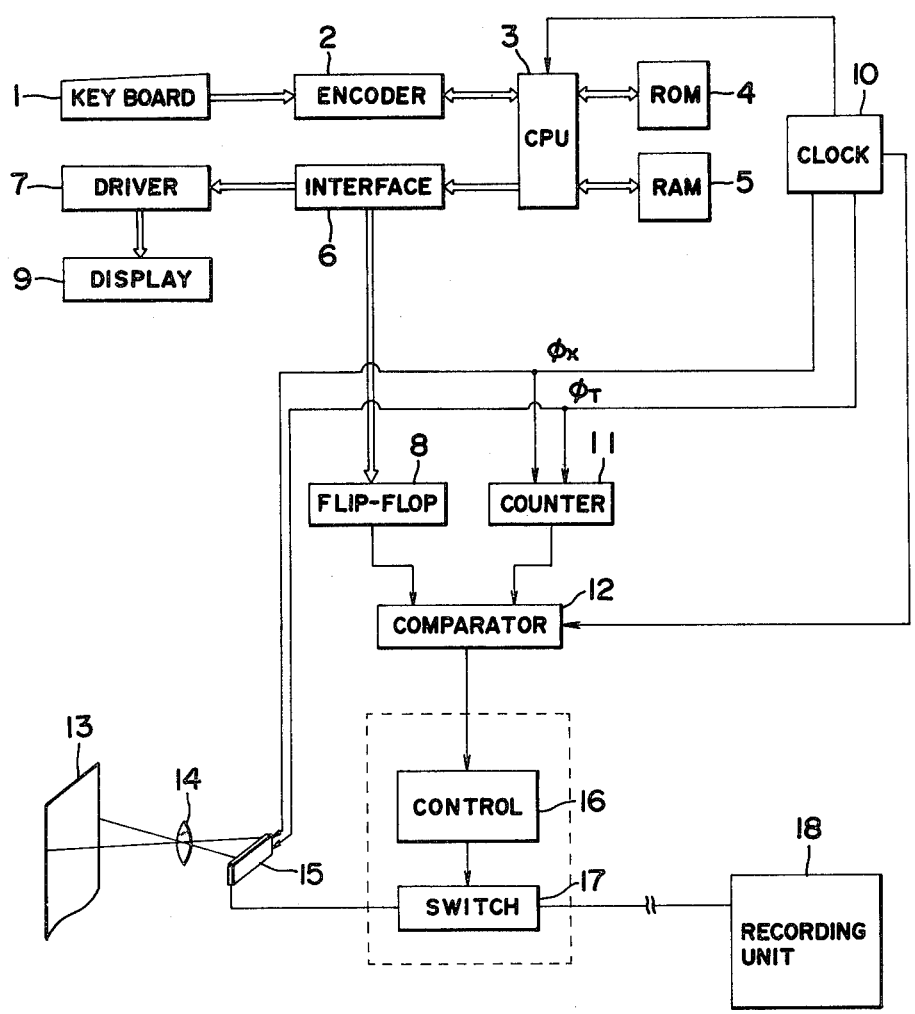
FIG. 1 is a block circuit diagram showing recording apparatus according to the present invention.

FIG. 1 is a block circuit diagram showing an recording apparatus according to the present invention. Reference numeral 1 generally indicates a key board, which is equipped, as exemplified in FIG. 2, with a record button 1a for starting the recording operation, an extraction button 1b to be depressed when a portion of a document image is to be extracted, an erasure button 1c to be depressed for erasure, position designating buttons 1d for designating a portion to be extracted or erased, and numeral buttons 1e for introducing the coordinates of the portion to be extracted or erased. Numeral 2 indicates an encoder for encoding the instruction which is introduced by the key board 1. Numeral 3 indicates a central processing unit (which will be shortly referred to as "CPU") for introducing and producing a variety of data in accordance with a program. Numeral 4 indicates a read only memory (which will be shortly referred to as "ROM") for storing a program for designating the positions of corresponding picture elements in a later-described photoelectric converter (e.g. the charge coupled device image sensor (CCD)). Numeral 5 indicates a random access memory (which will be shortly referred to as "RAM") for storing the number of bits corresponding to the coordinates determined by the CPU 3. Numeral 6 indicates an interface for so shaping the output of the CPU 3 as to fit for a display driver 7 and for a flip-flop 8 for storing the number of the bits corresponding to the coordinates. Numeral 9 indicates a display unit for displaying the position coordinates. Numeral 10 indicates a clock generator for generating both a document scanning frequency clock pulse $\phi_X$ and a CCD drive clock pulse $\phi_T$. Numeral 11 indicates a clock counting counter. Numeral 12 indicates a comparator for comparing the number of the bits corresponding to the input coordinates stored in the flip-flop 8 with the counted value of the counter 11. Numerals 13 and 14 indicates a document to be recorded and a lens, respectively. Numeral 15 indicates the CCD exemplifying the photoelectric converter for converting the optical image of the document into electric image signals in accordance with the clock pulses coming from the clock generator 10 and having frequencies $\phi_X$ and $\phi_T$. Numeral 16 indicates a blank signal generator for generating a control signal for controlling the passage of the image signals in accordance with the output from the comparator 12. Numeral 17 indicates an image signal switching unit for controlling the electric image signals produced by the CCD 15 in accordance with the control signal coming from the blank signal generator 16. Numeral 18 indicates a usual recording unit which is constructed of an electrostatic latent image unit including an ion modulating electrode, a multi-stylus electrode and an optical fiber tube, a developing unit, a transfer unit and a fixing unit.

Next, the manner of designating the portion of the document to be extracted or erased will be described in the following.

Figure 3:
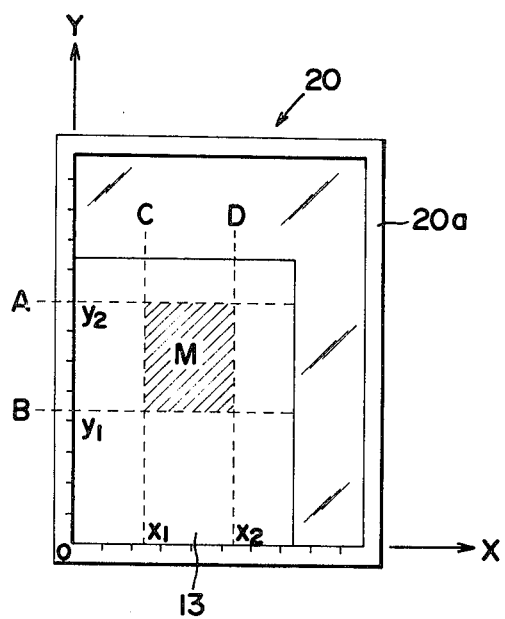
FIG. 3 is an illustrative explanatory view showing both a document to be recorded and a designated portion thereof.

With reference to FIG. 3, let the case be considered, in which such a portion M of the document 13 as is defined by four straight lines having coordinates A, B, C and D is to be extracted and recorded. A two-dimensional coordinate system is determined on a document glass plate 20, on which the document 13 is placed, with the coordinates of the respective points on the document glass plate being stored in advance in the memory (RAM) 5. As shown in FIG. 3, for examples, scales are attached in the directions of X and Y axes along the frame 20a of the document glass plate 20 with reference to such two-dimensional coordinate axes X and Y as are arbitrarily determined. In order to designate the portion M to be extracted, the positions of the coordinates A, B, C and D determining that portion M are introduced. In order to introduce the position of the point A, the button a of the position designating buttons 1d is first depressed, and suitable numeral buttons 1e are then depressed to introduced the coordinate $y_2$. Next, in order to introduce the position of the point B, the button B of the position designating buttons 1d is depressed to similarly introduced the coordinate $y_1$. The introductions of the positions of the points C and D are performed in similar manners. The coordinates thus introduced by means of the key board 1 are encoded into binary codes, for example, by the action of the encoder 2 and are fed to the CPU 3, and the corresponding scanning line and picture element numbers are calculated at the CPU 3 by the use of the coordinate information, which has been stored in advance in the memory (ROM) 4, and are fed out. The information of those scanning line and picture element numbers is stored through the interface 6 in the flip-flop 8.

Figure 4:
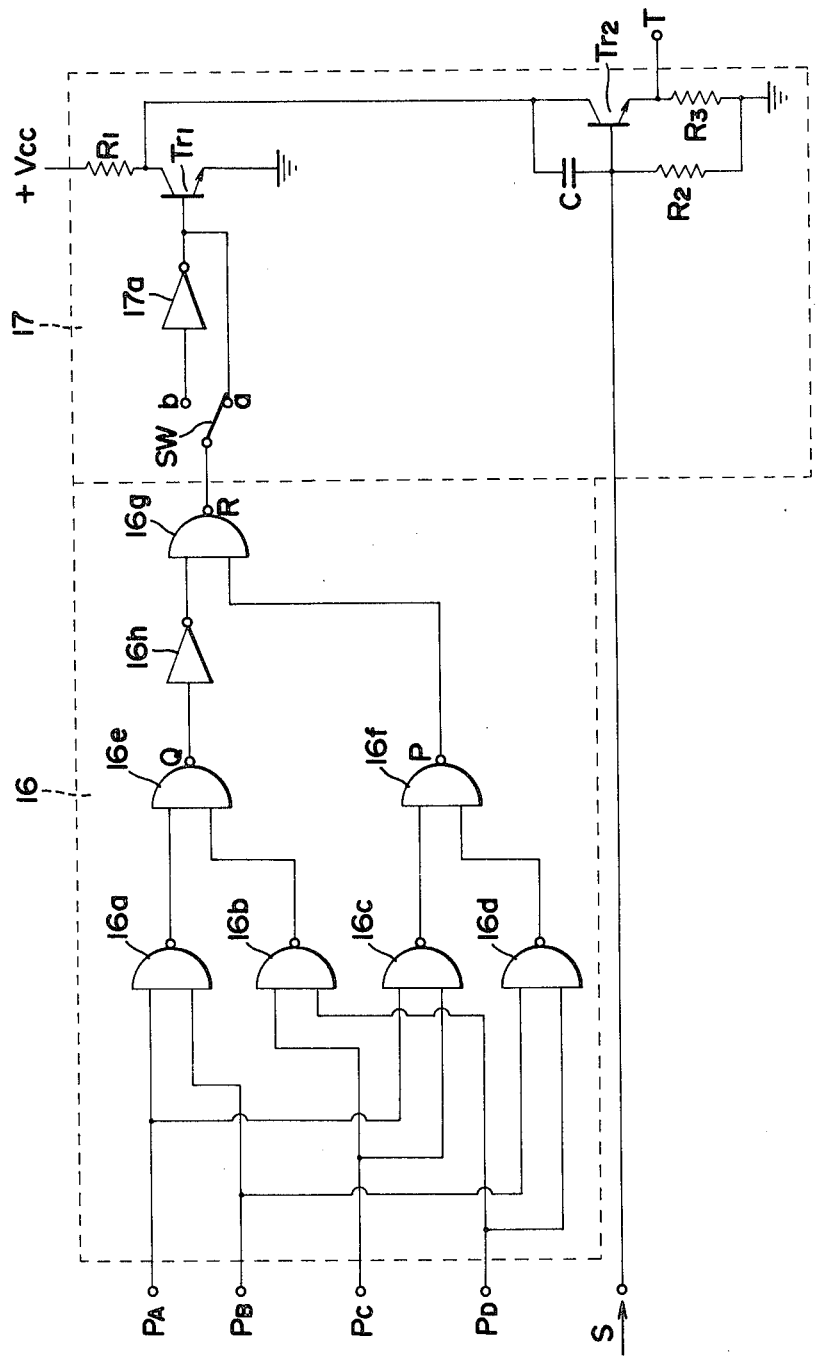
FIG. 4 is a circuit diagram showing one embodiment of a blank signal generating circuit and an image signal switching unit.

FIG. 4 shows one example of that portion of the apparatus which is shown to be surrounded by broken lines in FIG. 1, namely the blank signal generator 16 and the image switch signal unit 17. The comparator 12 produces output pulses $P_A$, $P_B$, $P_C$ and $P_D$ defining the coordinates of the four points determining the portion M to be extracted. The output pulse $P_A$ is produced when the counted value of the counter 11 reaches the number of the scanning lines corresponding to the line partitioning the extraction portion M and having the coordinate A. The output pulse $P_B$ is produced when the counted value of the counter 11 reaches the number of the scanning lines corresponding to the line having the coordinate B. The output pulse $P_C$ is produced when the counted value of the counter 11 reaches the number of bits corresponding to the line having the coordinate C. The output pulse $P_D$ is produced when the counted value of the counter 11 reaches the number of the bits corresponding to the line having the coordinate D. The blank signal generator 16 is constructed of NAND circuits 16a to 16g and an inverter 16h. The truth tables are obtained, as follows, if the outputs of the NAND circuits 16e, 16f and 16g are indicated at Q, P and R, respectively:

TABLE I

| $P_A$ | $P_B$ | $P_C$ | $P_D$ | P |
|---|---|---|---|---|
| 0 | 0 | 0 | 0 | 0 |
| 0 | 0 | 1 | 0 | 0 |
| 0 | 0 | 1 | 1 | 0 |
| 1 | 0 | 0 | 0 | 0 |
| 1 | 0 | 1 | 0 | 1 |
| 1 | 0 | 1 | 1 | 1 |
| 1 | 1 | 0 | 0 | 0 |
| 1 | 1 | 1 | 0 | 1 |
| 1 | 1 | 1 | 1 | 1 |

TABLE 2

| $P_A$ | $P_B$ | $P_C$ | $P_D$ | Q |
|---|---|---|---|---|
| 1 | 0 | 1 | 0 | 0 |
| 1 | 0 | 1 | 1 | 1 |
| 1 | 1 | 1 | 0 | 1 |
| 1 | 1 | 1 | 1 | 1 |

TABLE 3

| P | Q | R |
|---|---|---|
| 0 | 1 | 1 |
| 1 | 0 | 0 |
| 1 | 1 | 1 |
| 0 | 0 | 1 |

The expression "truth tables" as used herein means tables indicating the operating results of the output signals corresponding to the input signals in the logical circuit. Specifically, the output R=0 holds only while the region of the extraction portion M is being scanned. The image signal switching unit 17 is constructed of a switch SW (which has a contact a for an extraction mode and a contact b for an erasure mode) for switching the extraction and erasure modes, an inverter 17a, transistors $T_{r1}$ and $T_{r2}$, and resistors $R_1$, $R_2$ and $R_3$ and a condenser C, all of which are connected, as shown. Switch SW corresponds to buttons 1b and 1c of FIG. 2.

Next, the editing function by the apparatus of the present invention will be described for the case of the extraction by the use of the flow chart shown in FIG. 5.

The counter 11 is first cleared, and the coordinates of the lines A, B, C and D defining of the portion M of the document 13 to be extracted are introduced by the use of the position designating buttons 1d and the numeral buttons 1e of the key board 1. After the introductions of those coordinates have been completed, the extraction button 1b is depressed. After that, the record button 1a is depressed to start the recording operation. Then, either the document glass plate or the optical system starts to moves (by no means, not shown) so that the document is scanned. The optical image of the document is converted by the action of the CCD 15 into electric image signals S, which are consecutively applied to the image signal switching unit 17 in response to the clock pulses coming from the clock generator 10 and having the frequencies $\phi_X$ and $\phi_T$. Meanwhile, the counter 11 and the comparator 12 judge, while counting the clocks, whether or not the number of the scanning lines has reached the value (which is held in the flip-flop 8) corresponding to the line having the coordinate A. When that value is reached, the counter 11 and the comparator 12 further judge whether the number of the bits has reached the value (which is also held in the flip-flop 8) corresponding to the line having the coordinate C. The operations of the blank signal generator 16 and the image signal switching unit 17 during those scanning operations will now be described with reference to FIG. 4.

In the case of the extraction mode, the mode switching switch SW is connected with the contact a. As a result, while the region other than the designated portion M is being scanned, the output R takes a value "1", as is understood from the foregoing truth tables, so that the transistor $T_{r1}$ is rendered conductive so as not to apply a drive voltage $V_{CC}$ to the transistor $T_{r2}$. As a result, the image signals S do not appear at an output terminal T, in other words, are so blocked by the image signal switching unit 17 that they are not fed to the recording unit 18. On the contrary, since the output R takes a value "0" while the region of the designated portion M is being scanned, the transistor $T_{r1}$ is rendered nonconductive to apply the drive voltage $V_{CC}$ to the transistor $T_{r2}$. As a result, the image signals S are produced at the output terminal T and fed to the recording unit 18. Thus, when the region other than the designated portion M is scanned, the image signals are not fed to the recording unit 18 so that no recording operation is performed. When the region of the designated portion M is scanned, the image signals are fed to the recording unit 18 so that the recording operation is performed to extract the designated portion M.

In the case of the erasure mode, the switch SW is connected with the contact b. As a result, since the output R takes the value "1" while the region other than the designated portion M is being scanned, the output of the inverter 17a takes the value "0". As a result, the transistor $T_{r1}$ is rendered nonconductive to apply the drive voltage $V_{CC}$ to the transistor $T_{r2}$ so that the image signals S are produced at the output terminal T and fed to the recording unit 18. On the contrary, since the output R takes the value "0" while the region of the designated portion M is being scanned, the output of the inverter 17a takes the value "1" so that the transistor $T_{r1}$ is rendered conductive to apply the drive voltage $V_{CC}$ to the transistor $T_{r2}$, whereby the image signals S are blocked from being fed to the recording unit 18. Thus, when the region other than the designated portion M is scanned, the image signals are fed to the recording unit 18 so that the recording operation is performed. On the contrary, when the region of the designated portion M is scanned, the image signals are not fed to the recording unit 18 so that the recording operation is not performed, whereby the designated portion M is erased.

Figure 5:
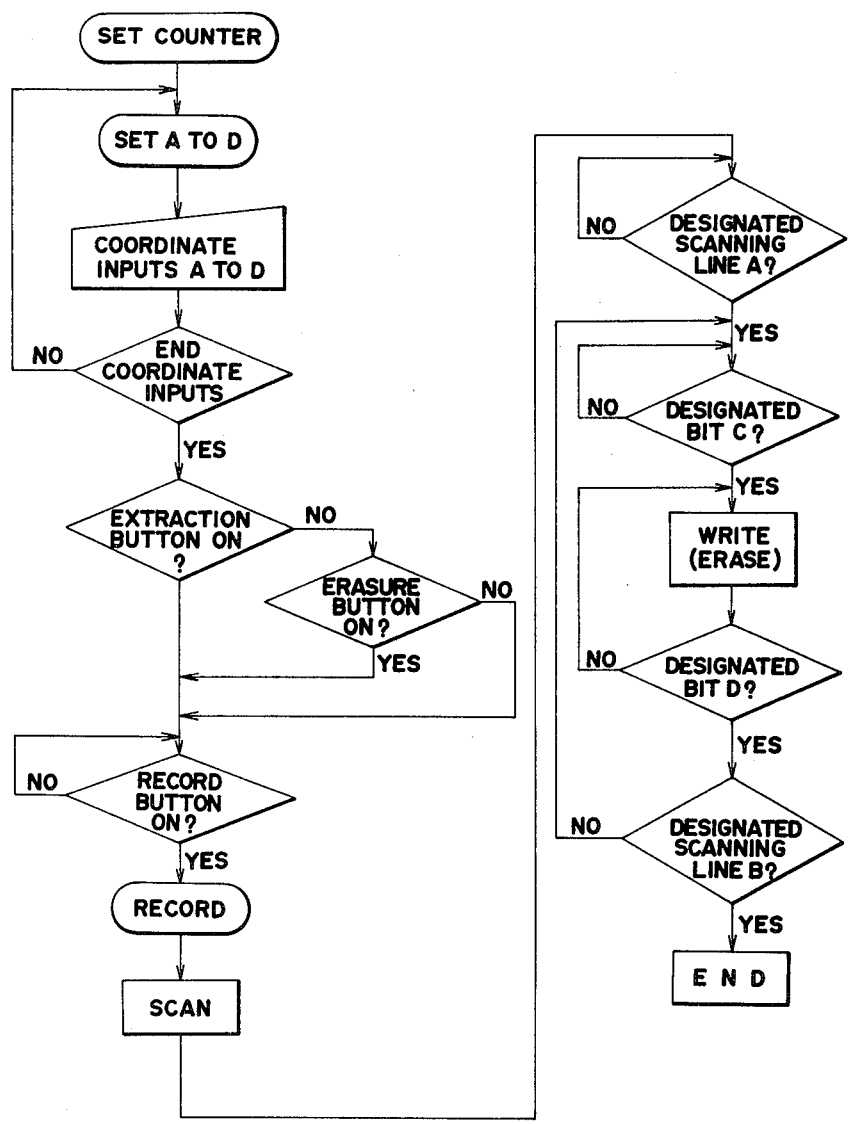
FIG. 5 is a flow chart showing an extracting operation making use of an editing function.

Reverting to the flow chart of FIG. 5, when the number of the scanning lines reaches the value corresponding to the coordinate A and when the number of the bits reaches the value corresponding to the coordinate C, the image signals S are fed to the recording unit 18 thereby to start the writing operation, as has been described in the above. Thus, the writing operation is performed until the number of the scanning lines reaches the value corresponding to the coordinate B and until the number of the bits reaches the value corresponding to the coordinate D. The writing operation is ended when those numbers of the scanning lines and the bits are reached.

Although the foregoing description has been made upon the extraction of the designated portion M, the erasure of the designated portion is performed absolutely similarly.

Moreover, although the foregoing embodiment is directed to the example in which the designated portion of the document is to be extracted or erased, the present invention can also extract or erase a portion of the information, which is fed out of a computer or transmitted through a communication line and which is displayed in a display unit, similar to the case of the document image merely by designating the coordinates of that portion of the information on the display by means of a light pen or the like.

As has been described hereinbefore, according to the present invention, since the ON-OFF of the electric image signals, which have been prepared by photoelectrically converting the document image, are controlled in accordance with the position coordinates introduced in advance so that the extraction or erasure of the predetermined portion of the document is electrically performed, the mechanism and operation of the apparatus can be remarkably simplified, and the special element such as the transparent plastic film to be used in the overlay method can be dispensed with.

Figure 6:
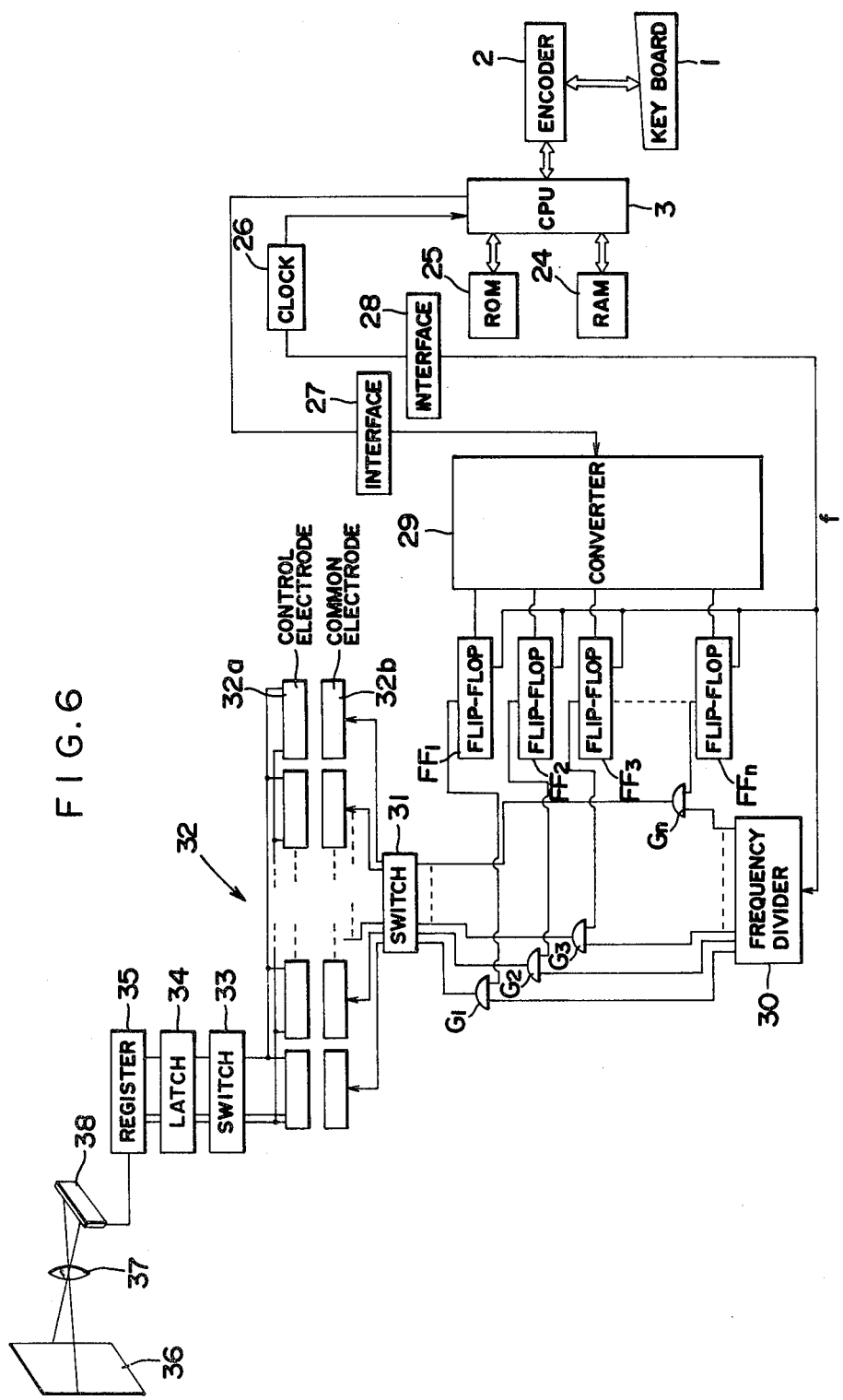
FIG. 6 is a block circuit diagram showing an electrostatic recording apparatus according to another embodiment of the present invention.

FIG. 6 is a block circuit diagram showing an electrostatic recording apparatus according to another embodiment of the present invention, in which an ion modulating electrode is used as the electrostatic latent image forming means. The key board 1 is made the same as that shown in FIG. 2. The encoder 2 is made operative to encode the instruction which is introduced at the key board 1. The central processing unit 3 (which is constructed of a CPU counter and a comparator) is used for counting the various data in accordance with the program. Reference numeral 24 indicates a read only memory (which will be shortly referred to as "RAM") for storing the counted result of the processing unit 3. Numeral 25 indicates a read only memory (which will be shortly referred to as "ROM") which is stored with the correspondence between the coordinates of the coordinate system determined on the document and the common electrode of the ion modulating electrodes. Numeral 26 indicates a clock generator. Numeral 27 indicates an interface including an optically coupled isolator connected between the processing unit 3 and a series-parallel converter 29. Numeral 28 indicates an interface including an optically coupled isolator connected between the clock generator 26 and a frequency divider 30. Letters $FF_1$ to $FF_n$ indicate an n number of flip-flops. Letters $G_1$ and $G_n$ indicate AND gates, which have their one side input terminals connected with the n number of the terminals of the frequency divider 30, respectively, and their other side input terminals connected with the flip-flops $FF_1$ and $FF_n$, respectively. The respective flip-flops are fed with the clocks from the clock generator 26. Numeral 31 indicates a common electrode switching circuit which is turned on and off in response to the output signals from the AND gates $G_1$ to $G_n$. Numeral 32 indicates ion modulating electrodes composed of a segmented layer of a conductive material as control electrodes 32a and common electrodes 32b, which are divided into an n number of groups and are subjected to group control by the action of the switching circuit 31. On the other hand, the control electrode 32a of the ion modulating electrodes 32 are connected to a control electrode switching circuit 33. Numerals 34 and 35 indicate a latch circuit and a shift register, respectively. The image signals are produced by converting the optical image of a document 36 to be recorded through a lens 37 by the action of a CCD 38. Incidentally, a charge retaining member, on which an electrostatic latent image is formed by the actions of the ion modulating electrodes 32, as well as the developing unit, the transfer unit and the fixing unit are omitted from FIG. 6.

Figure 2:
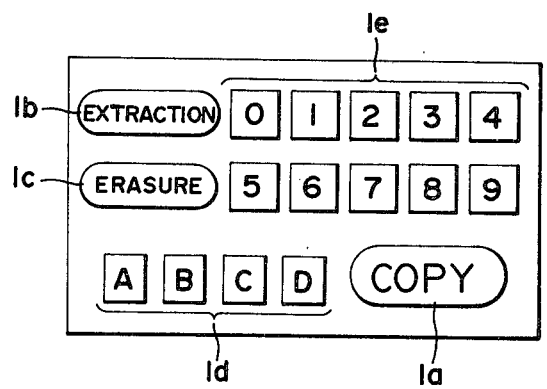
FIG. 2 is a front elevation of a key board to be used with the present invention.

The manner of designating that portion of the document to be extracted or erased is similar to that which has already been described with reference to FIGS. 2 and 3. The operations of the electrostatic recording apparatus shown in FIG. 6 will be described in the following. By way of example, the image signals to be fed out of the CCD 38 are assumed to have 2048 bits, and the ion modulating electrodes 32 are assumed to be divided into sixteen group of 128 bits so that they are subjected to the group control.

Figure 7A:
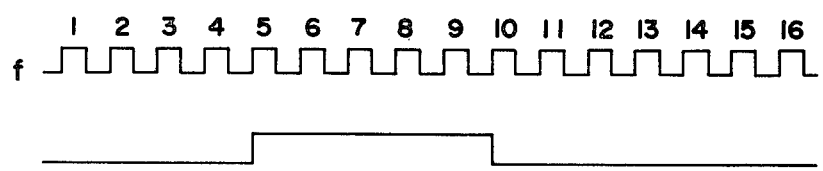
FIGS. 7A, 7B, 7C and 7D are timing charts of the outputs of the respective portions of the electric block diagram showing in FIG. 6.
Figure 7B:
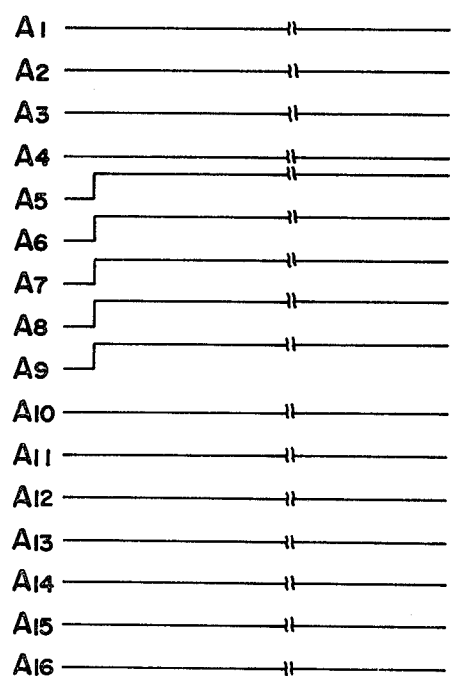
Figure 7C:
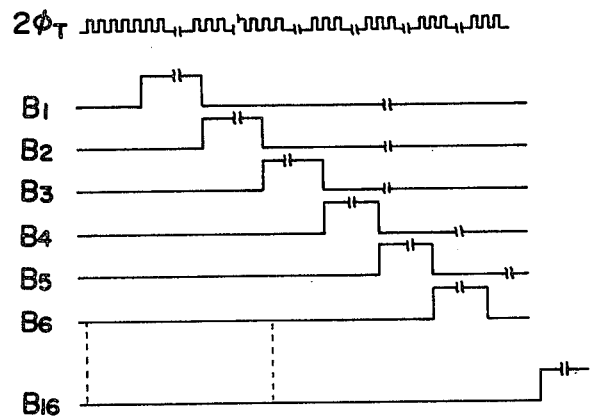
Figure 7D:
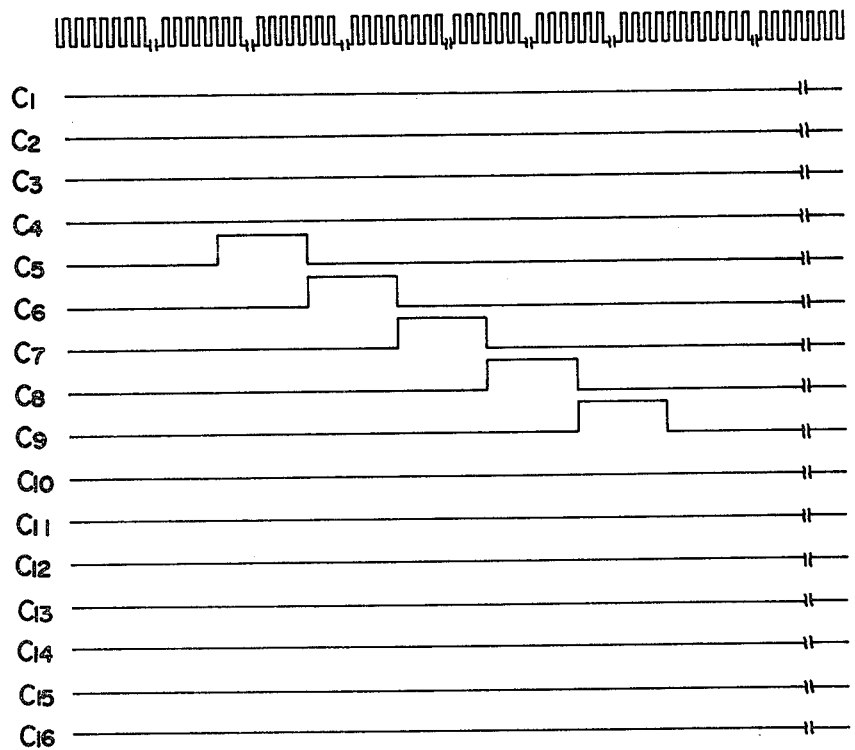

When the coordinate signals designating the portion M to be extracted are introduced from the key board 1, as has been described above, the corresponding common electrode number of the ion modulating electrodes 32 and and the scanning line number are calculated in the CPU in the processing unit 3 from the data stored in the memories 24 and 25. If the fifth to ninth common electrodes, for example, are to be energized, the series signals, as shown in FIG. 7A, are fed out of the CPU. These series signals are converted by the series-parallel converter 29 into parallel signals, which are applied to the one side input terminals of the flip-flops $FF_1$ to $FF_{16}$. FIG. 7B shows the outputs $A_1$ to $A_{16}$ of the flip-flops $FF_1$ to $FF_{16}$. On the other hand, pulses are consecutively fed for every 128 bits out of the frequency divider 30 and are consecutively applied to the other side input terminals of the AND gates $G_1$ to $G_{16}$. FIG. 7C shows the input signals $B_1$ to $B_{16}$ to be fed to the AND gates $G_1$ to $G_{16}$. As a result, the outputs $C_1$ to $C_{16}$ of the AND gates $G_1$ to $G_{16}$ are shown in FIG. 7D, and only the AND gates $G_5$ to $G_9$ produces the outputs at the level "1" so that the potential is impressed upon the fifth to ninth common electrodes 32b by the action of the common electrode switching circuit 31. Incidentally, the extraction in the direction of the Y axis, i.e., between the coordinates A and B is determined by the number of the series signals from the processing unit 3, as shown in FIG. 7. This number corresponds to the input from the key board 1.

Figure 8:
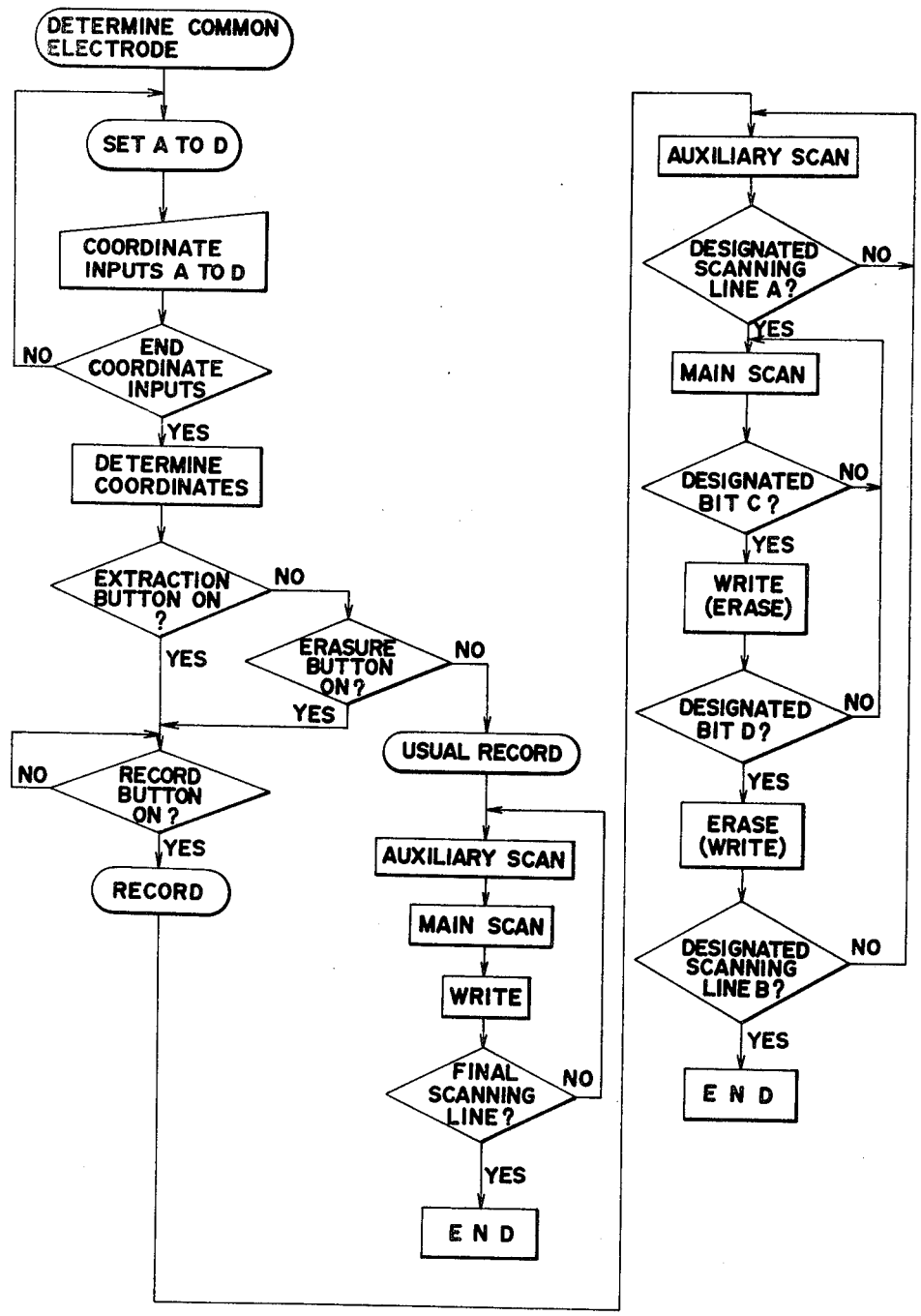
FIG. 8 is a flow chart showing an extracting operation having an editing function according to the embodiment of FIG. 6.

Next, the editing function of the apparatus thus constructed according to the second embodiment will be described in the case of the extraction with reference to the flow chart shown in FIG. 8.

The common electrodes of the ion modulating electrodes are first determined, and the coordinates designating the portion M of the document 36 to be extracted are then introduced by means of the key board 1. After the introductions of those coordinates have been completed, the extraction button 1b of the key board 1 is depressed. After that, the recording button 1a is depressed to start the recording operation. Either the document glass plate or the optical system starts to move so that the document is scanned to start the scanning operation in the auxiliary scanning direction, whereby the electric image signals of the document 36 are fed out of the CCD 38 and are consecutively introduced into the shift register 35. As the auxiliary scanning operation advances in that way, whether or not the number of the scanning lines has reached the value corresponding to the coordinate A is judged so that the auxiliary scanning operation is continued until that value is reached. When it is judged that the value is reached, the scanning direction in the main direction, i.e., in the widthwise direction of the document is started. When the number of the bits in the main scanning direction reaches the line C of the designated portion M, the AND gates $G_5$ to $G_9$ thereafter produce their outputs at the level "1", as has been described with reference to FIG. 7, thereby to turn on the corresponding switching circuit 31 so that the voltage is applied to the corresponding fifth to ninth common electrodes, thus starting the writing operation in the charge retaining member. After that, whether or not the number of the scanning lines has reached the value corresponding to the coordinate B of the designated portion M is judged. The writing operation is continued, if that value is not reached, and is ended when that value is reached.

Although the foregoing description is directed to the extraction of the designated portion M, the erasure of that portion is performed absolutely similarly.

As has been described hereinbefore, the present invention relates to electrostatic recording apparatus in which the electric image signals, prepared by photoelectrically converting the document image, are fed to the electrostatic latent image forming means such as the ion modulating electrodes, thereby to form the electrostatic latent image corresponding to the image signals on the charge retaining member so that the electrostatic latent image is electrophotographically processed to record that image. In this apparatus, a predetermined portion of the document is electrically extracted or erased by controlling the potential which is to be impressed upon the common electrodes of the electrostatic latent image forming means, in a manner to correspond to the portion of the document to be extracted or erased, the mechanism and operation of the apparatus can be remarkably simplified, and the special element such as the transparent plastic film to be used in the overlay method can be dispensed with.

What is claimed is:

1. A document editing apparatus comprising means determining the spatial coordinates of that portion of a document image to be extracted or erased, means translating said coordinates into electrical signals, means storing such coordinate signals, means scanning a document to be edited, means converting the optical image of said document into electric image signals, means recording the edited document, means producing control signals from said stored coordinate signals, including switching means determining whether the selected portions of the document image should be extracted or erased, image signal switching means for actuating said recording means, and means applying said electric image signals and said control signals to said image signal switching means.

2. A document editing apparatus according to claim 1, in combination with a display unit responsive to said translating means for displaying the selected coordinates.

3. A document editing apparatus according to claim 1, in combination with a clock signal generator, and means applying the generated clock signals to said control means to synchronize their action upon said image signal switching means.

4. A document editing apparatus according to claim 1, in which said recording means includes an ion modulator.

5. A document editing apparatus according to claim 4, in which said ion modulator includes a plurality of control electrodes for generating image signals and a common electrode, and in which said image signal switching means includes applying said electric image signals to said control electrodes and said control signals to said common electrode.

6. A document editing apparatus according to claim 5, in combination with a clock signal generator, and means applying the generated clock signals to said common electrode.

* * * * *